United States Patent [19]
Oda et al.
[11] Patent Number: 4,769,658
[45] Date of Patent: Sep. 6, 1988

[54] INK JET RECORDING APPARATUS WITH PRESSURE ADJUSTABLE MECHANISMS FOR DISCHARGING A CONSTANT INK AMOUNT

[75] Inventors: Gen Oda, Ebina; Masayoshi Miura; Kenji Akami, both of Kawasaki, all of Japan

[73] Assignee: Matsushita Electric Industrial Co., Ltd., Osaka, Japan

[21] Appl. No.: 95,703

[22] Filed: Sep. 14, 1987

[30] Foreign Application Priority Data

| | | | |
|---|---|---|---|
| Sep. 16, 1986 | [JP] | Japan | 61-217418 |
| Sep. 22, 1986 | [JP] | Japan | 61-224484 |
| Apr. 23, 1987 | [JP] | Japan | 62-100394 |
| Apr. 24, 1987 | [JP] | Japan | 62-102253 |

[51] Int. Cl.[4] .......... G01D 15/16
[52] U.S. Cl. .......... 346/140 R
[58] Field of Search .......... 346/140, 75

[56] References Cited

U.S. PATENT DOCUMENTS

| | | | |
|---|---|---|---|
| 4,106,032 | 8/1978 | Miura et al. | 346/140 |
| 4,403,234 | 9/1983 | Miura et al. | 346/140 |

*Primary Examiner*—Joseph W. Hartary
*Attorney, Agent, or Firm*—Pollock, Vande Sande & Priddy

[57] ABSTRACT

In an ink jet recording apparatus, there is provided an air adjusting member (16) between an ink jet printing head (30) and an air supply source (12), and further provided an ink tank (11*a*) having an air introducing duct (20) including an air chamber (18) at the upper portion of an ink storage (19) and a duct extending to almost the bottom of the ink tank (11*a*). The air adjusting member has a smaller inside cross-sectional area than that of an air pipe (8), and placed nearby the ink jet recording head (30). The volume of the air chamber (18) is at least 10 to 20% by capacity of the ink tank (11*a*).

21 Claims, 9 Drawing Sheets

INK JET RECORDING APPARATUS WITH PRESSURE ADJUSTABLE MECHANISMS FOR DISCHARGING A CONSTANT INK AMOUNT

BACKGROUND OF THE INVENTION

1. Field of the Invention

This invention relates generally to ink jet recording apparatus for recording letters and/or pictures on a recording medium by an ink-discharge using an airflow, and which responds to an electric signal, and particularly to an ink jet recording apparatus with pressure adjustable mechanisms for discharging a constant ink amount.

2. Prior Art

Recently, various types of printers are popularly utilized as peripheral equipment. Above all, ink jet printers have advantages such as noiselessness, ease of application to color printers, and high picture quality. As to methods for discharging ink, the use of an airflow and an electrostatic force bring about a superior response. Various types of ink jet printers are known, and one example of the ink jet printers is disclosed in U.S. Pat. No. 4,403,234.

A conventional ink jet recording apparatus using an airflow and an electrostatic force comprises a nonconductive air nozzle plate having an air nozzle and a conductive ink nozzle plate being set in parallel with the air nozzle plate. The air nozzle plate has an electrode and has an ink nozzle for keeping an ink meniscus. The electrode and the conductive ink nozzle plate are connected to a signal source to establish an electric field gradient therebetween. The ink nozzle plate and the air nozzle plate are secured to a rear housing to define an ink chamber and an annular airflow chamber. The ink chamber is connected to an ink tank for storing ink therein through an ink pipe, and the ink receives a constant pressure by a pressure regulator regulating a pressurized air from the air supply source. The pressurized air from an air supply source flows into the annular airflow chamber via an air pipe, and then flows out via the air nozzle. Such airstream makes a sharp pressure gradient at an annular laminar-airflow space between the ink nozzle and the air nozzle. Owing to the electric field gradient and the sharp pressure gradient, the meniscus is extended and discharged via the air nozzle.

A condition of the meniscus is influenced by a difference between the level of the ink in the ink tank and the level of the ink nozzle, and by a distance between the air nozzle plate and the ink nozzle plate. The difference and the distance give great influence to recording characteristics including a record response of ink jet printing head and a threshold voltage, i.e. the minimum voltage for ink-discharge. Therefore, the difference and the distance have to be set to an optimum value such that an ink meniscus formed at the ink nozzle is in a convex shape.

However, if the distance has an error of only 2 or 3 μm, the difference has to be change by approximately 20 to 30 mm indeed to make the meniscus having the convex shape, so that an adjustment amount of the difference comes to large. Thus, there is a problem relative to the adjustment of the difference. In addition, if such conventional mechanism for adjusting the difference is applied to a multi-head printer, the deference does not assume a constant value, or varies among ink jet heads, due to difficulty in practical manufacturing processes.

To remove the above problems, a mechanism for moving the ink tank up and down is considered. However, this technique has another drawback that it is required another mechanism for moving the ink tank in response to the amount of remaining ink, thereby complicating the structure of printers.

SUMMARY OF THE INVENTION

The present invention has been developed in order to remove the above-described drawbacks inherent to the conventional ink jet recording apparatus.

It is, therefore, an object of the present invention to provide new and useful ink jet recording apparatus with pressure adjustable mechanisms so that the amount of the discharging ink is constant, or does not decrease in accordance with the amount of remaining ink.

It is another object of the invention to provide ink jet recording apparatus with a pressure adjustable mechanisms having a simple structure so that it is not required to move the ink tank in accordance with the amount of remaining ink.

It is a further object of the present invention to provide new and useful ink jet recording apparatus with a pressure adjustable mechanism for making all of uniform height between the ink level in the ink tanks and coresponding ink nozzles in a multi-head, without deterioration of recording characteristics.

The above objects can be achieved, according to the invention, by an ink jet recording apparatus comprising a detachable air adjusting member having a smaller inside cross-sectional area than that of connecting means between the air supply source and the ink jet printing head, and an ink tank having introducing means having a duct and an air chamber.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 8:
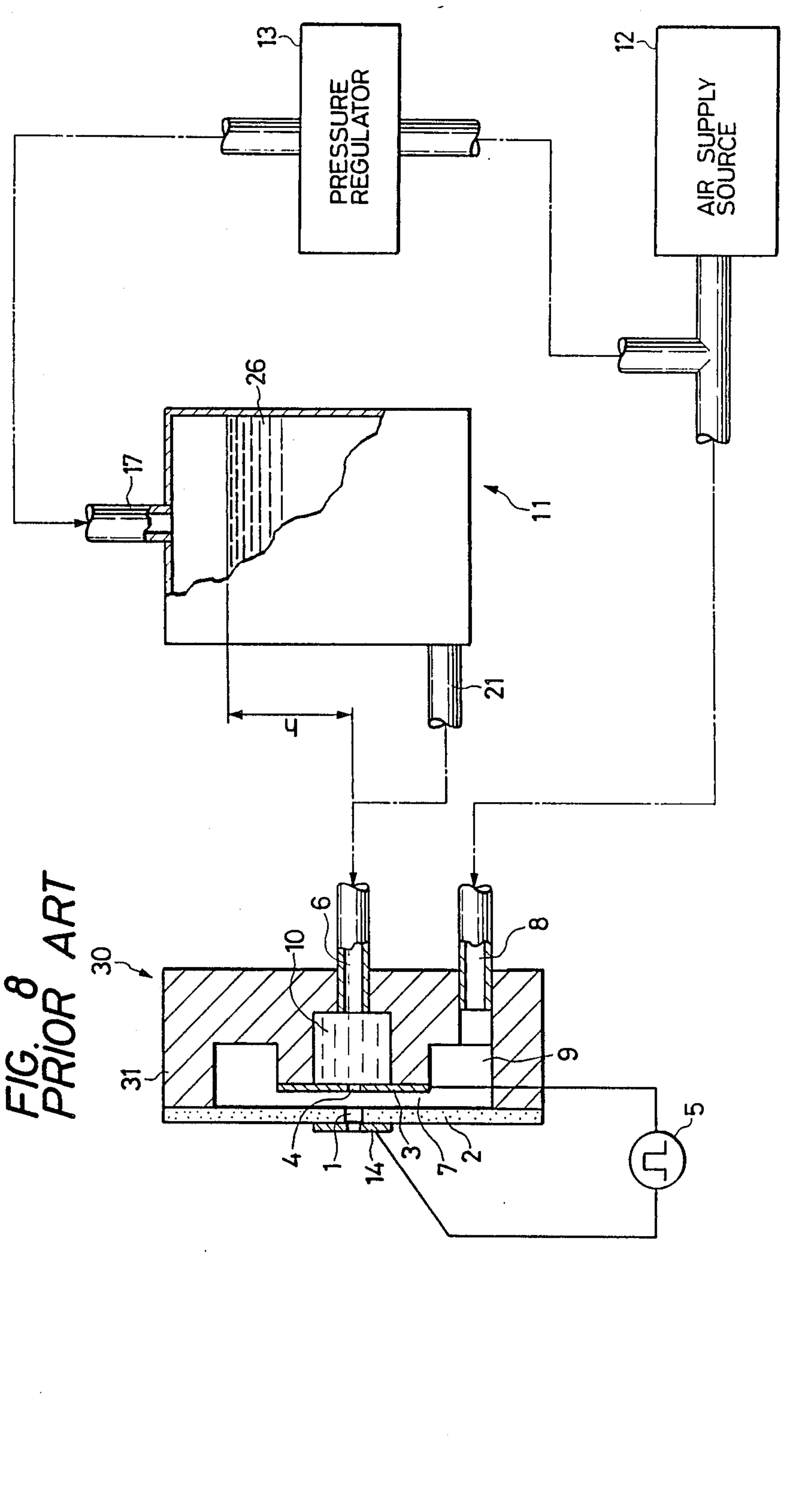
FIG. 8 PRIOR ART
FIG. 8 shows a conventional ink jet recording apparatus.

Prior to describing the preferred embodiments of the sent invention, the above-mentioned conventional ink jet recording apparatus using an air flow and an electrostatic force will be described for a better understanding of the present invention. Referring to FIG. 8, a printing head 30 comprises an air nozzle plate 2 having an air nozzle 1 and an ink nozzle plate 3 being set in parallel with the air nozzle plate 2. The air nozzle plate 2 is made of a nonconductive material and secured to a rear housing 31 made of a nonconductive material. The ink nozzle plate 3 is made of a conductive material and secured to the rear housing 31. The air nozzle plate 2 has an electrode 14, and the ink nozzle plate 3 has an ink nozzle 4 for keeping an ink meniscus. The ink nozzle plate 3 and the rear housing 31 define an ink chamber 10. The air nozzle plate 2, the ink nozzle plate 3, and the rear housing 31 define an annular airflow chamber 9. The ink chamber 10 is connected, through an ink line or an ink pipe 6, to an ink tank 11 for storing ink 26 therein, and the ink 26 receives a constant pressure by a pressure regulator 13 regulating a pressurized air from an air supply source 12. The pressurized air flows into the annular airflow chamber 9 via an air line or an air pipe 8, and then flows out via the air nozzle 1. Such airstream makes a sharp pressure gradient at an annular laminar-airflow space 7 between the ink nozzle 4 and the air nozzle 1.

A signal source 5 is connected to an electrode 14 and the conductive ink nozzle plate 3 thereby developing an electric potential difference between the air nozzle 1 and the ink nozzle 4. Therefore, the ink meniscus is stretched out in the direction to the air nozzle 1 by the electric potential difference and is torn off along the sharp pressure gradient made by the airflow in the annular laminar-airflow space 7. Owing to effects of the electrostatic force and the sharp gradient, the ink meniscus is discharged via the air nozzle 1.

Reference "h" is difference between the level of the ink nozzle 4 and the ink level in the ink tank 11. A distance between the ink nozzle plate 3 and ink nozzle plate 2, i.e. "thickness" of the annular laminar-airflow space 7 gives great influence to record characteristics including a record response of ink jet printing head and a threshold voltage, i.e. the minimum voltage for ink-discharge. Therefore, the distance have to be set to an optimum value such that an ink meniscus formed at the ink nozzle is in a convex shape. According to experiments, this distance is preferably set to approximately 10 μm to obtain satisfactory recording characteristics. Owing to this, there is an adjustment by a distance between the air nozzle plate 2 and the ink nozzle plate 3. However, in the case that the distance has an error of only 2 or 3 μm, the difference "h" has to be changed by approximately 20 to 30 mm indeed to make balance between the pressure in the ink chamber 10 and the pressure on the outer surface of the meniscus. Thus, an adjustment amount of the difference "h" comes to large. Therefore, there is a problem relative to the adjustment of the difference "h".

If such a conventional mechanism for adjusting a balance between the pressure in the ink chamber 10 and the pressure on the outer surface of the meniscus is applied to a multi-head printer (not shown) having a multi-head comprising a plurality of ink jet printing heads and ink tanks, the difference "h" does not assume a constant value, or varies among the ink jet heads. This is because the distance of the annular laminar-airflow space 7 usually differs throughout a plurality of heads due to difficulty in practical manufacturing processes. As described before, the difference "h" gives influence to ink-discharge. Namely, it is easy to discharge the ink 26 when the difference "h" comes to large, so that the amount of discharging ink is increased. On the contrary, the amount of the discharging ink is decreased when the difference "h" comes to small.

As a result, the use of the conventional ink tank 11 as shown in FIG. 8 bring about a disadvantage that the amount of the discharging ink gradually decreases in accordance with the amount of remaining ink thereby diluting the density of ink discharged on a recording medium. To remove the above disadvantage, a mechanism for moving an ink tank up and down is suggested. However, this technique has another drawback that it is required another mechanism for moving the ink tank in response to the amount of remaining ink, thereby complicating the structure of printers.

Figure 1A:
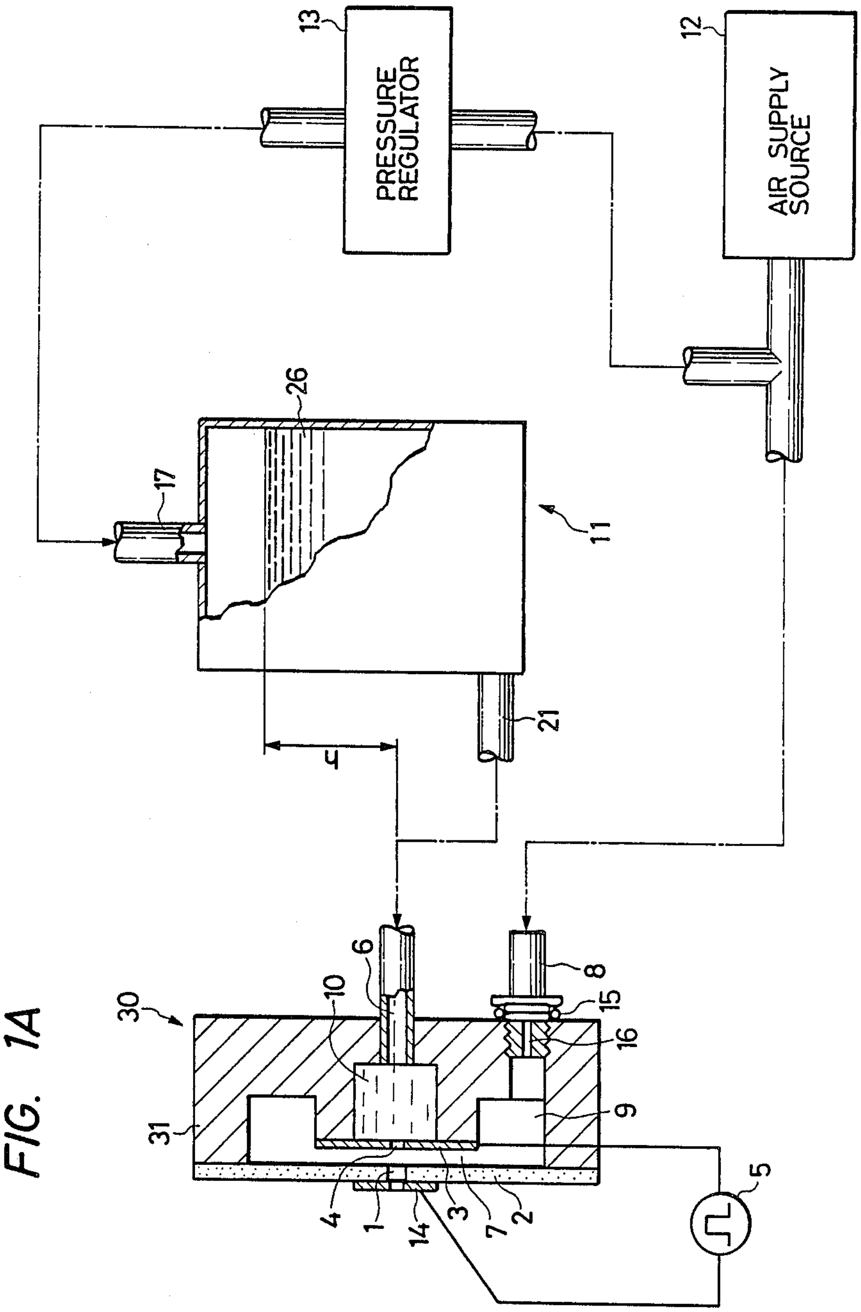
FIG. 1A is a schematic view showing an ink discharging system of and ink jet recording apparatus according to first embodiment of the present invention.

Referring now to FIG. 1A, there is shown an ink jet printing head and its associated devices according to the first embodiment of the present invention. The same or corresponding elements and parts are designated at like reference numerals throughout the drawings.

A printing head 30 comprises an air nozzle plate 2 having an air nozzle 1 and an ink nozzle plate 3 being set in parallel with the air nozzle plate 2. The air nozzle plate 2 is made of a nonconductive material and secured to a rear housing 31 made of a nonconductive material. The ink nozzle plate 3 is made of a conductive material and secured to the rear housing 31. The air nozzle plate 2 has an electrode 14, and the ink nozzle plate 3 has an ink nozzle 4 for keeping an ink meniscus. The electrode 14 and the conductive ink nozzle plate 3 are connected to a signal source 5 to establish an electricfield gradient therebetween. The ink nozzle plate 3 and the rear housing 31 define an ink chamber 10. The air nozzle plate 2, the ink nozzle plate 3, and the rear housing 31 define an annular airflow chamber 9. The ink chamber 10 is connected, through an ink line or an ink pipe 6, to an ink tank 11 for storing ink 26 therein, and the ink 26 receives a constant pressure by a pressure regulator 13 regulating a pressurized air from an air supply source 12. The pressurized air flows into the annular airflow chamber 9 via an air line or an air pipe 8 and an air adjusting member 16, and then flows out via the air nozzle 1. Such airstream makes a sharp pressure gradient at an annular laminar-airflow space 7 between the ink nozzle 4 and the air nozzle 1. Owing to the electric field gradient and the sharp pressure gradient, the meniscus is extended and discharged via the air nozzle 1.

The air adjusting member 16 is set with an O-ring 15 to make a uniform airflow in the annular airflow chamber 9. The air adjustng member 16 may be pipy, and has a small inside cross-sectional area in comparison with the air pipe 8. It is to be noted that the air adjusting member 16 is detachably provided so as to be another air adjusting member having a different inside cross-sectional area. More specifically, a plurality of air adjusting members 16 each having different inside cross-sectional area are prepared so that one of them is selectively used to establish an optimum balance between the outer surface of the meniscus and the ink chamber 10. While the length of the plurality of the air adjusting pipes 16 is approximately 10 mm, the inner-diameters of the same are successively different by 0.1 mm for example.

Reference "h" is a difference between the level of the ink 26 in the ink tank 11 and the level of the ink nozzle 4. Generally, a condition of the meniscus is influenced by the difference "h". Namely, it is easy to discharge the ink 26 when the difference "h" is large, so that the amount of discharging ink is increased. On the contrary, the amount of discharging ink is decreased when the difference "h" is small. In the case of adopting an air adjusting pipe having a diameter of approximately 1 mm, the difference "h" is required to change by only 10 to 20 mm when the pipe inner-diameter is changed by 0.1 mm.

The air adjusting member 16 set at near the ink jet printing head 30 brings about pressure loss by resistance generated at the time when the airflow passes through the air adjusting pipe 16. Although two elements of a length and an inside cross-sectional area of the air adjusting pipe 16 influence the pressure loss by the airflow, the adjustment by the inside cross-sectional area is better than the adjustment by the pipe length. This is because the pipe length cannot be set to a large value in practical. As a matter of fact, the adjustment may be controlled by both elements.

Here, on the occasion that the inner-diameter is greater than 2 mm, the pressure loss hardly occurs and therefore the use of the air adjusting pipe 16 is not effective. In addition, the air adjusting pipe 16 is preferably close to head, because the airflow in the head is influenced by the pressure regulator 13 if the pipe 16 is set nearby the air supply 12.

As will be understood from the above, in the case of the multi-head printer, it is easy to adjust the difference "h" among the ink jet heads, and reliability of an ink jet printing head can be improved with a small space and with low cost, and it is possible that the difference "h" can be uniformed in multi-head printers.

Figure 1B:
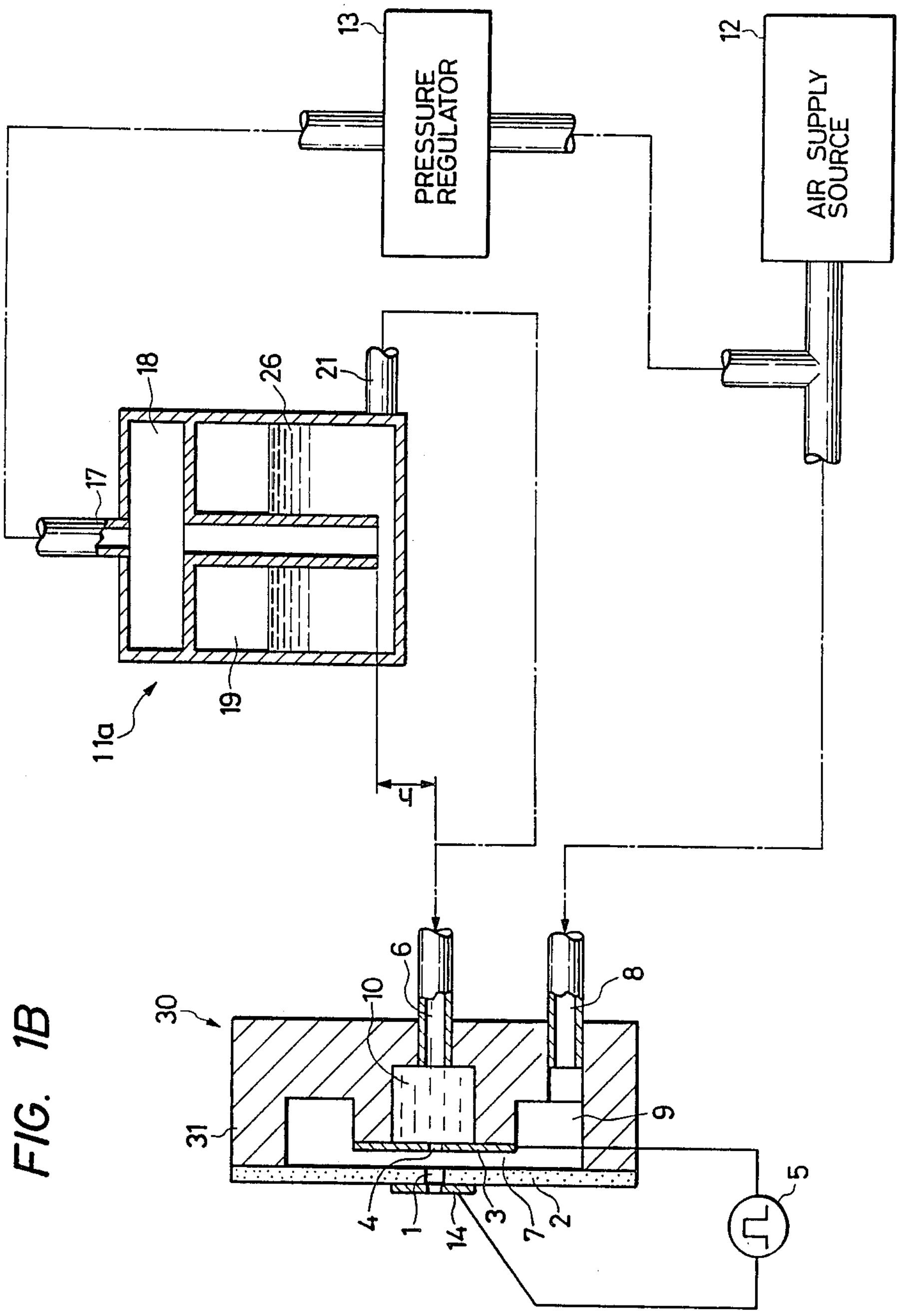
FIG. 1B is a schematic view showing an ink discharging system of an ink jet recording apparatus according to second embodiment of the present invention.
Figure 2:
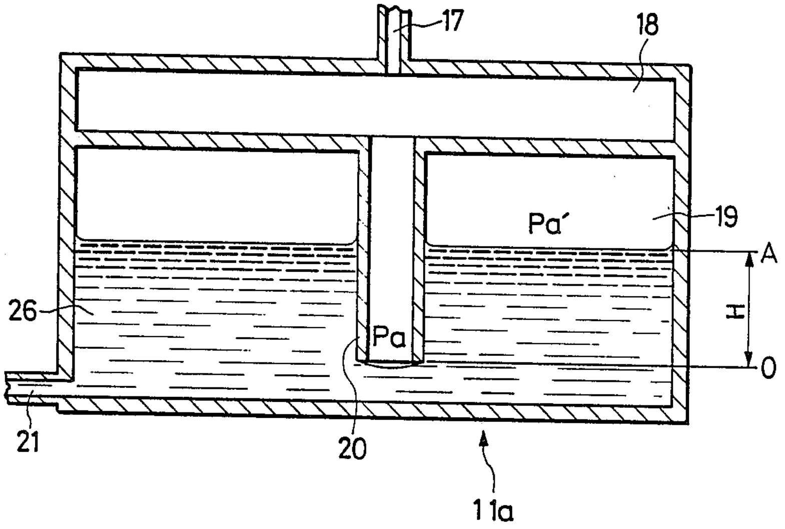
FIG. 2 is a cross-sectional view of an ink tank used in the second embodiment of FIG. 1B.

FIG. 1B is a schematic view showing an ink discharging system of an ink jet recording apparatus according to the second embodiment of the present invention. In this embodiment, the ink discharging system differs from FIG. 1A only in the following points. The air adjusting pipe 16 shown in FIG. 1A is absent, and another ink tank **11*a* is applied instead the ink tank 11 shown in FIG. 1A. The ink tank 11*a* is shown in FIG. 2**.

The pressurized air from the air supply source 12 flows into an air chamber 18 through an air inlet 17 in order to pressurize the ink 26 in an ink storage 19 via an air introducing means, such as a pipe or an air introducing duct 20 which extends to almost the bottom of the ink tank **11*a*. The ink 26 in the ink storage 19 is supplied from an ink outlet 21 to the ink chamber 10 in the ink jet printing head 30 via the ink pipe 6**.

During operation of the ink jet recording apparatus, an air pressure Pa from the air supply source 12 is applied to the ink tank **11*a* and the ink jet printing head 30 to make a stable meniscus at the ink nozzle 4, thereby pressing the ink 26 in the ink storage 19 through the air introducing duct 20. When spending the ink 26, the same amount of air as the spending ink 26 flows out from the air introducing duct 20 so that ink level which substantially affects the ink jet printing head 30 assumes at the height O of the lower end of the air introducing duct 20. Therefore, the liquid level in the ink storage 19 is always kept at the height O in spite of the amount of the remaining ink 26 in the ink storage 19. Here, assuming a reference A is the height of a boundary between the air of the upper portion in the ink storage 19 and the ink 26 in the same, an air pressure Pa' in the ink storage 19** is given by:

$$Pa' = Pa - \rho gH$$

wherein a reference $\rho$ is the density of the ink 26, and a reference g is the gravitational acceleration, as well as a reference H is the height of level A relative to level O. It will be seen that the value of the pressure Pa' changes in acordance with the amount of the ink 26 in the ink storage 19 so that equibrium is established in connection with the air pressure Pa acting on the level O. Namely, a substantial pressure head which affects the ink jet printing head 30 exists at the position or level of the height O, and this substantial pressure head has no relation to the height A.

As will be realized that the ink tank according to the present invention has an air introducing means such as a pipe or duct, whereby the pressure head at the ink level substantially affecting the ink jet printing head can be established to a constant value at the height O. As a result, it is possible to provide that new and useful ink jet recording apparatus having constant ink-discharging characteristics in spite of the remaining amount of the ink 26.

Figure 1C:
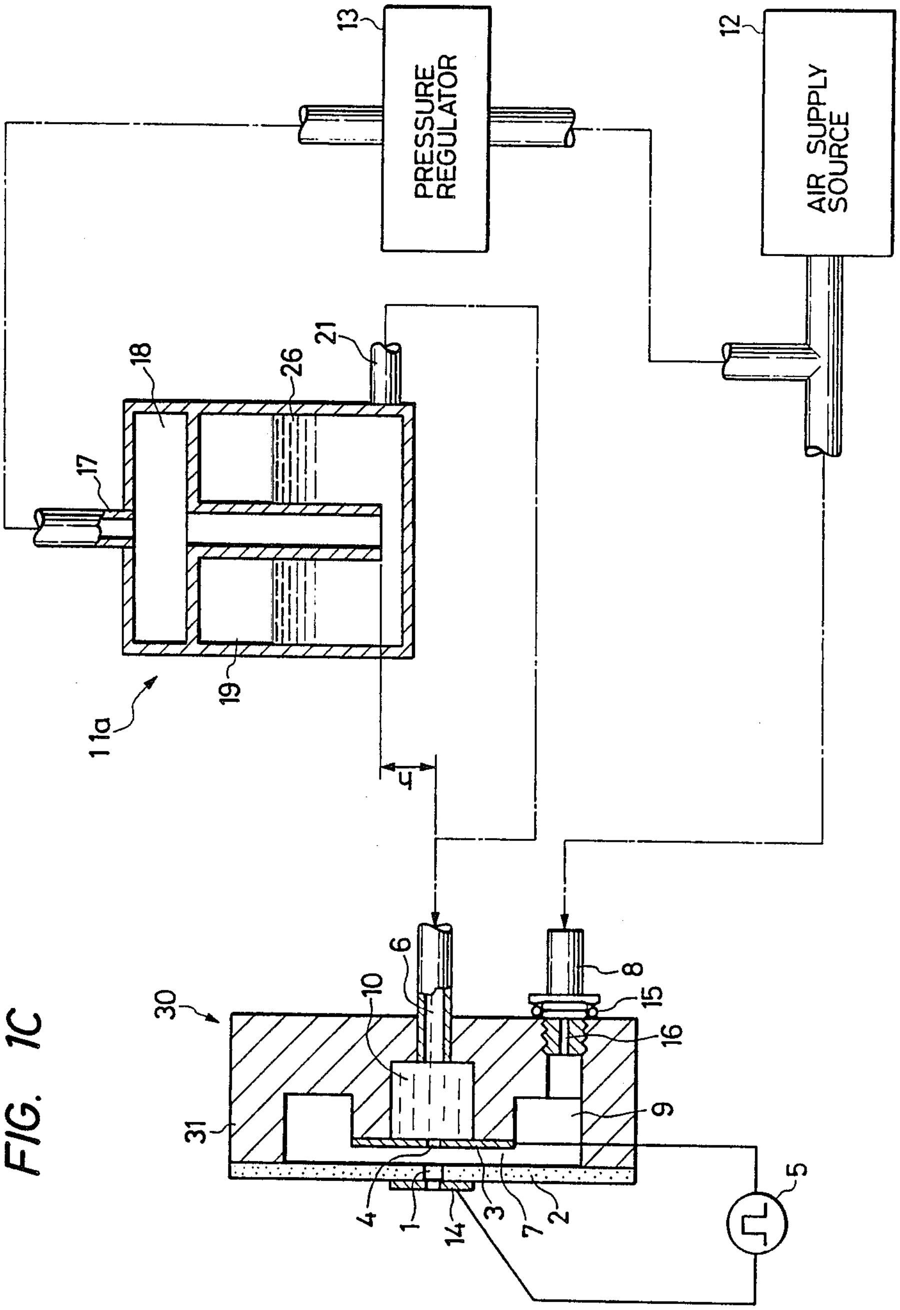
FIG. 1C is a schematic view showing an ink discharging system of a ink jet recording apparatus according to third embodiment of the present invention.

FIG. 1C is a schematic view showing an ink discharging system of an ink jet recording apparatus according to the third embodiment of the invention. In this embodiment, the first embodiment of FIG. 1A and the second embodiment of FIG. 2 are combined. Therefore, the above-mentioned effects of the use of the air adjusting pipe 16 and the use of the ink tank **11*a*** can be obtained, so that the recording characteristics are further improved.

Figure 3A:
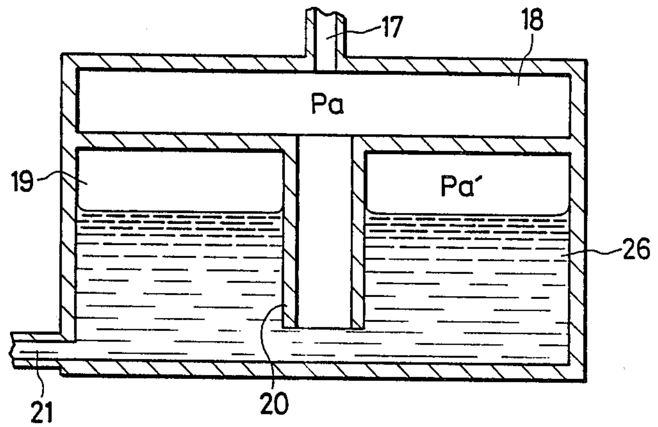
FIG. 3A is a cross-sectional view of a pressurized ink tank of FIG. 2.
Figure 3B:
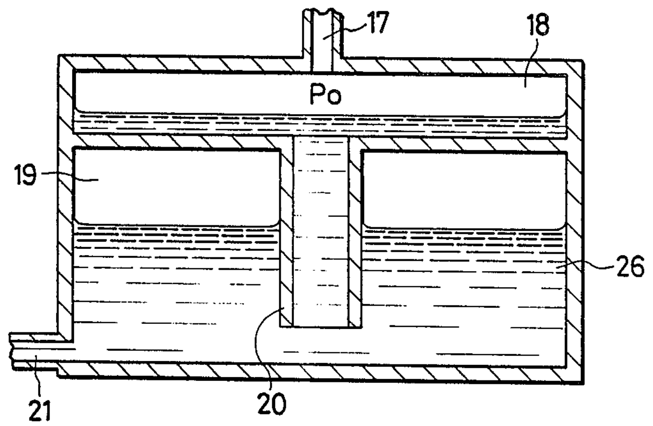
FIG. 3B is a cross-sectional view of a non-pressurized ink tank of FIG. 2.

FIG. 3A illustrates a pressurized ink tank **11*a*, and FIG. 3B shows a non-pressurized ink tank 11*a* used in the invention. In FIG. 3A, the air pressure Pa' is applied to the air chamber 18, and the air pressure Pa' is applied to the upper portion of the ink storage 19. If the air pressure Pa is not applied to the ink tank 11*a*, the value of the pressure Pa is decreased to the value of an atmospheric pressure Po so that the air pressure Pa' is also decreased. Therefore, the ink 26 in the ink storage 19 flows into the air chamber 18 as shown in FIG. 3B. Owing to such flown ink, the air chamber 18 is provided, and operates so as to prevent the ink 26 in the ink storage 19 from flowing out via the air inlet 17**.

Although it is required that the capacity of the air chamber 18 is more than the volume of the ink in the ink storage 19, an actual minimum capacity of the air chamber 18 can be determined by the capacity of the ink storage 19 and the magnitude of the air pressure Pa. Assuming that a reference V' is the air volume of the upper portion in the ink storage 19 as shown in FIG. 3A, an expanded air volume V1 when pressurized or the amount of the ink flowing into the air chamber 18 is roughly given by:

$$V1 = Pa'/Po \cdot V'$$

wherein Po is an atmospheric pressure. As well as the volume V of the ink storage 19 is larger than V', and Pa' is just smaller than Pa. Accordingly, the necessary condition of the minimum volume V2 of the air chamber 18 is roughly given by the following formula:

$$V2 > Pa/Po \cdot V$$

Generally, since the air pressure Pa assumes from 0.08 to 0.15 kg/cm$^3$, a volume corresponding to approximately 10 to 20% of the capacity of the ink tank is required for the air chamber 18.

Figure 4:
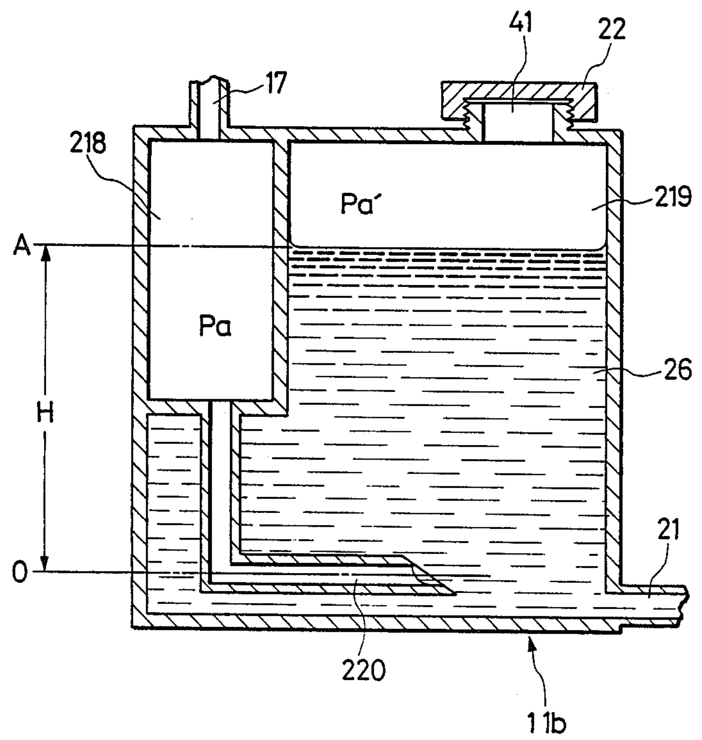
FIG. 4 is a cross-sectional view of a modified ink tank of FIG. 2.

FIG. 4 is an illustration of a modified ink tank used in the invention. The pressurized air from the air supply source 12 flows into an air chamber 218 through an air inlet 17 to pressurize the ink 26 in an ink storage 219 via an air introducing duct 220.

The end of the air introducing duct 220 is obliquely cut so as to look upward such that the pressurized air is easy to flow out of a large opening in response to the consumption of the ink 26. More specifically, since bubbles at the end of the air introducing duct 220 is difficult to enter the liquid when the cross-sectional area of the opening at the the end of the air introducing duct 220 is small, this cross-sectional area is made large by the above-mentioned oblique configulation. The configulation of the contact surface between the pressurized air and the ink 26 in the ink storage 219 different at the time between just before and just after the bubbles flow out from the air introducing duct 220. Besides, some ink flows into the air introducing duct 220 when the ink tank **11*b* is vibrated or impacted. However, since the air introducing duct 220 extends to almost the bottom of an ink tank 11*b* and further extends in the horizontal direction, it is able to keep the height O constant which is established at a contact position between the pressurized air and the ink in the ink storage 219**. This is because the contact surface is shifted or moved only in the horizontal direction even if the ink tank is impacted or vibrated.

Figure 5A:
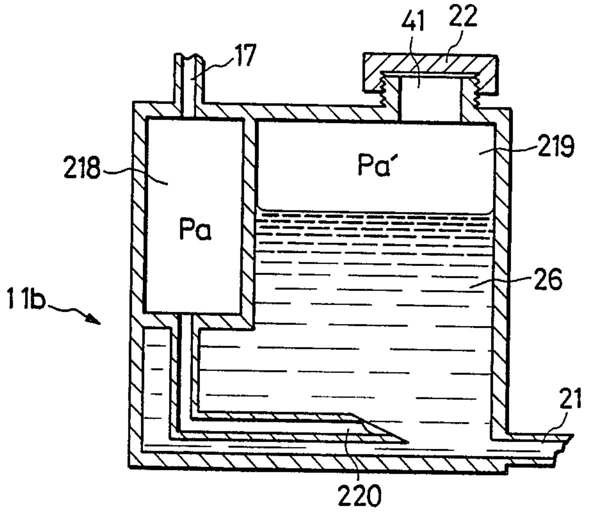
FIG. 5A is a cross-sectional view of the pressurized ink tank of FIG. 4.
Figure 5B:
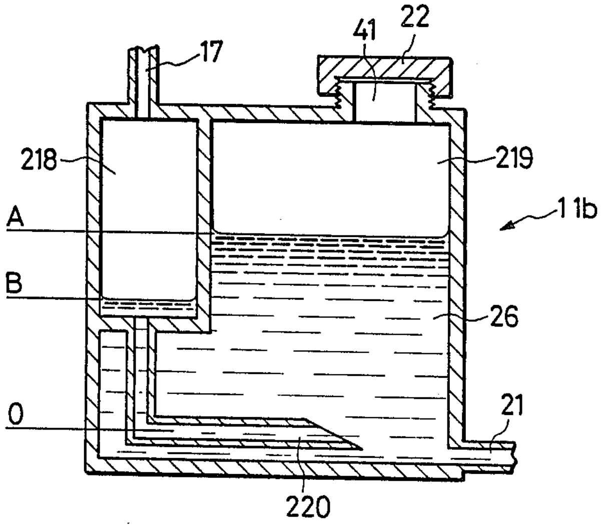
FIG. 5B is a cross-sectional view of the non-pressurized ink tank of FIG. 4.

In this embodiment, the ink level which substantially affects the ink jet printing head 30 is established at the position as shown in FIG. 5B if the pressurized air is applied to the ink 26. The height B being established by the liquid level of the ink 26 which flows into the air chamber 218 is a substantial ink level while the pressurized air is not aplied. However, since the height B changes in accordance with the amount of the remaining ink, the height B is not constant. Therefore, the pressure head acting on the ink jet printing head is not constant while the ink jet recording apparatus is not operated in which no air pressure is applied. At this time, the substantial ink level in the ink tank is generally preferably lower than the ink nozzle level because a droplet from the ink nozzle 4 is brought about by the height difference therebetween wherein the ink nozzle level is lower than the substantial ink level. Accordingly, in the construction of the embodiment of the invention, the height B should not be too much higher than the height O.

Figure 6:
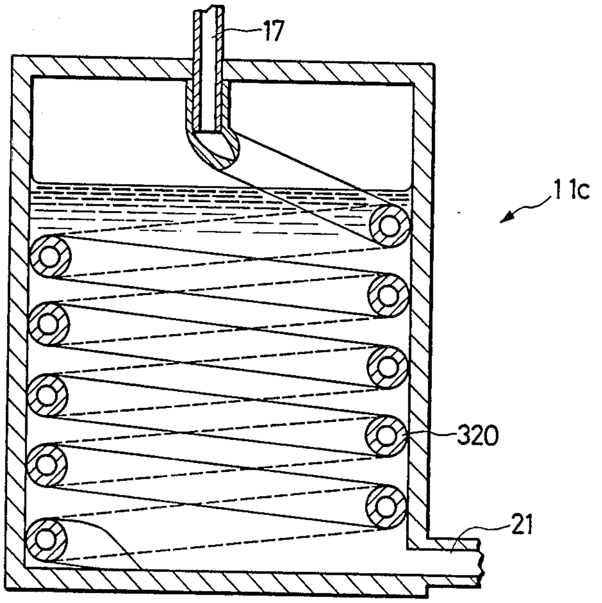
FIG. 6 is a cross-sectional view of another modified ink tank of FIG. 2.

FIG. 6 illustrates another modified ink tank **11*c* used in the invention. An air introducing pipe 320 is spiral for example, and may be made of a flexible material. The air introducing pipe 320 is also used itself for an air chamber corresponding to the air chamber 18 or 218 because the air introducing pipe 320 can be sufficiently extended so that the volume of the air introducing pipe 320** can be increased. As a result, any other air chamber is not required in such example.

Figure 7:
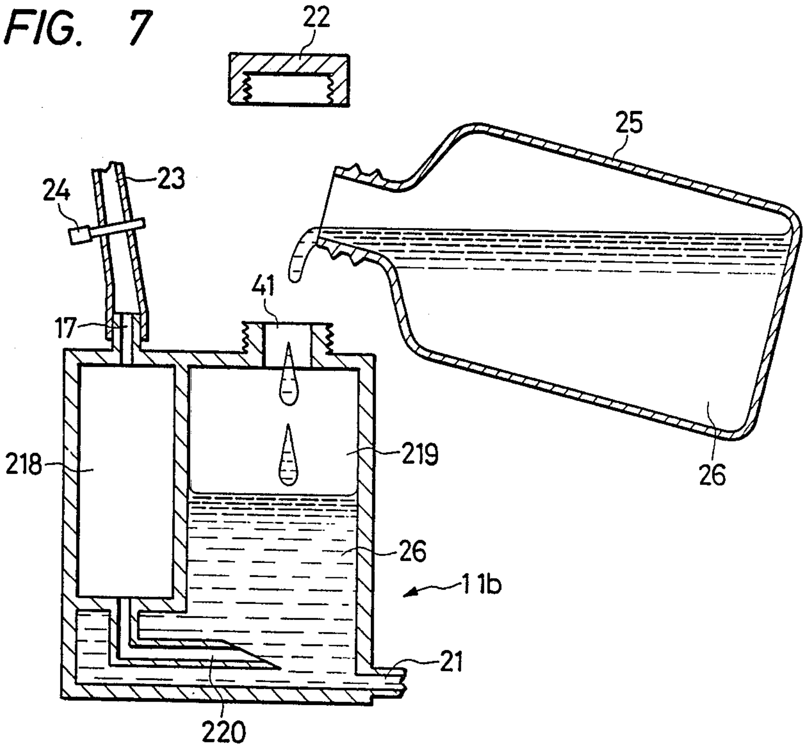
FIG. 7 is an explanatory diagram of a method for supplying ink according to the invention.

FIG. 7 is an explanatory diagram showing a method for supplying the ink 26 according to the invention. The ink tank **11*b* has an opening 41 for supplying ink 26. The opening 41 is closed by a cap 22 during operation of the ink jet recording apparatus. The opening 41 and cap 22 shown in FIG. 7 are not shown in Figs. 1A, 1B, 1C, 2, 3A, 3B and 6. The cap is taken off and a tube 23 which connects the air supply source 12 to the air outlet 17 is closed by a block instrument 24 such as a clip, in order to seal the air chamber 218**.

Here, if the air chamber 218 is not sealed, the air in the air chamber 218 comes to an atmospheric pressure when the cap 22 is taken off, and then the ink level comes to a given level with the ink 26 flowing into the air chamber 218. If the ink level is preset in the air chamber 218 as such when the ink 26 is supplied, such an ink level hardly lowers, i.e. the air is not introduced to the air introducing pipe 220 even when the pressurized air is resupplied to the air chamber 218. This is because the volume of the air at the upper portion in the ink storage 219 is small after the ink 26 is supplied, that is to say, the amount of the contractable air in the ink storage 219, is small. Therefore, the ink level which substantially affects the ink jet printing head 30 is established in the air chamber 218 until at least the same ink amount as the flowing ink into the air chamber 218 is expended. As a result, it means that the ink level substantially influencing ink jet printing head 30 is lowered or changed, i.e. the difference "h" is not constant.

As shown in FIG. 7, the ink 26 in an ink bottle 25 is led into the ink storage 219 from the opening 41. At this time, since the air chamber 218 is sealed, the ink does not flow into the air chamber 218. After the opening 41 is closed by the cap 22, as well as the block instrument 24 is taken off, the supplied ink 26 comes to the condition of the ink 26 as shown in FIG. 5A when the pressurized air is resupplied to the tank **11*b*. In the case of ink supply just after the ink jet recording apparatus is assembled, the ink 26 is supplied to ink tank 11*b* from the opening 41 after the air inlet 17 and the ink outlet 21** are closed.

As will be understood from the above-mentioned ink tank having an air introducing means having a pipe or a duct and/or an air chamber, and the above-mentioned method for supplying ink according to the present invention, the substantial ink level in the ink tank is established a certain value. As a result, it is possible to provide useful ink jet recording apparatus with pressure adjustable mechanisms that the amount of the discharging ink is constant, or does not decrease in accordance with the amount of remaining ink, with low cost and with high reliability. Besides, ink jet recording apparatus with pressure adjustable mechanisms having a simple structure without moving the ink tank in response to the amount of remaining ink, and keeping all of uniform height between the ink level in the ink tanks and corresponding ink nozzles in a multi-head, without deterioration of recording characteristics.

The present invention can also be applied to recording apparatus having printing heads using an airflow and a duration by a piezoelectric device, and one example of such recording apparatus is described in U.S. Pat. No. 4,106,032. In this case, the electric field gradient may not be required.

It will thus be seen that the objects made apparent from the preceding description, are efficiently attained and, since certain changes may be made in the above construction without departing from the spirit and scope of the invention, it is intended that all matters contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet recording apparatus comprising:
(a) an air supply source for supplying pressurized air;
(b) an ink tank for storing ink therein;
(c) a pressure regulator for regulating said pressurized air from said air supply source, said ink tank being arranged to receive regulated pressurized air from said pressure regulator;
(d) an ink jet printing head including:
(i) an air nozzle plate having an air nozzle;
(ii) an ink nozzle plate having an ink nozzle;
(iii) a rear housing defining a laminar airflow space together with said air nozzle plate, and defining an ink chamber together with said ink nozzle plate, said laminar airflow space communicating with said air supply source via a conduit means, said ink chamber communicating with said ink tank; and
(e) an air adjusting member having a smaller inside cross-sectional area than that of said conduit means.

2. An ink jet recording apparatus as claimed in claim 1, further comprising means for establishing an electric field gradient between said air nozzle and said ink nozzle.

3. An ink jet recording apparatus as claimed in claim 1, wherein said air adjusting member is detachablly provided in said conduit means and nearby said ink jet printing head.

4. An ink jet recording apparatus as claimed in claim 1, wherein said ink jet printing head is a multi-head having a plurality of said ink jet heads.

5. An ink jet recording apparatus as claimed in claim 1, wherein said ink tank has an air introducing means and an ink storage.

6. An ink jet recording apparatus as claimed in claim 5, wherein said air introducing means includes a duct extending to almost a bottom of said ink tank.

7. An ink jet recording apparatus as claimed in claim 6, wherein said duct has a spiral form.

8. An ink jet recording apparatus as claimed in claim 6, wherein said ink tank has an air chamber at the upper portion of said duct.

9. An ink jet recording apparatus as claimed in claim 8, wherein said air chamber has a volume V2 satisfying the following formula:

$$V2 > Pa/Po \cdot V$$

wherein Pa is an air pressure from the air supply source; Po is an atmospheric pressure; and V is a capacity of the ink storage.

10. An ink jet recording apparatus as claimed in claim 8, wherein an end portion of said duct is further extended in the horizontal direction.

11. An ink jet recording apparatus as claimed in claim 10, wherein an open end portion of said duct is obliquely cut so as to look upward.

12. An ink jet recording apparatus as claimed in claim 11, wherein said air chamber is formed at the side portion of said ink tank.

13. An ink jet recording apparatus as claimed in claim 12, wherein said air chamber has a volume V2 satisfying the following formula:

$$V2 > Pa/Po \cdot V$$

wherein Pa is an air pressure from the air supply source; Po is an atmospheric pressure; and V is a capacity of the ink storage.

14. An ink jet recording apparatus as claimed in claim 13, wherein said ink jet printing head is a multi-head having a plurality of ink jet printing head.

15. An ink jet recording apparatus comprising:
(a) an air supply source for supplying pressurized air;
(b) an ink tank for storing ink therein, including an ink storage and an air introducing means having a duct extending to almost a bottom of said ink tank;
(c) a pressure regulator for regulating said pressurized air from said air supply source, said ink tank being arranged to receive regulated pressurerized air from said pressure regulator; and
(d) an ink jet printing head including:
(i) an air nozzle plate having an air nozzle;
(ii) an ink nozzle plate having an ink nozzle; and
(iii) a rear housing defining a laminar airflow space together with said air nozzle plate, and defining an ink chamber together with said ink nozzle plate, said laminar airflow space communicating with said air supply source via a conduit means, said ink chamber communicating with said ink tank.

16. An ink jet recording apparatus as claimed in claim 15, wherein said ink tank further comprises an air chamber having a volume V2 satisfying the following formula:

$$V2 > Pa/Po \cdot V$$

wherein Pa is an air pressure from the air supply source; and Po is an atmospheric pressure; and V is a capacity of the ink storage.

17. An ink jet recording apparatus as claimed in claim 15, further comprising means for establishing an electric field gradient between said air nozzle and said ink nozzle.

18. An ink jet recording apparatus as claimed in claim 15, further comprising an air adjusting member having a smaller inside cross-sectional area than that of said conduit means, said air adjusting member is detachablly provided in said conduit means and nearby said ink jet printing head.

19. An ink jet recording apparatus as claimed in claim 15, wherein said air introducing means has a spiral form.

20. An ink jet recording apparatus as claimed in claim 15, wherein said air introducing means has a portion which is extended in the horizontal direction, and an open end portion of said air introducing means is obliquely cut so as to look upward.

21. An ink jet recording apparatus as claimed in claim 15, wherein said ink jet printing head is a multi-head having a plurality of said ink jet printing heads.

* * * * *